(12) United States Patent
Fidrych

(10) Patent No.: US 9,027,515 B2
(45) Date of Patent: May 12, 2015

(54) SLIDER DEVICE FOR A PET COLLAR/HARNESS

(76) Inventor: Paul Fidrych, Portland, OR (US)

( * ) Notice: Subject to any disclaimer, the term of this patent is extended or adjusted under 35 U.S.C. 154(b) by 82 days.

(21) Appl. No.: 13/606,595

(22) Filed: Sep. 7, 2012

(65) Prior Publication Data

US 2014/0069352 A1    Mar. 13, 2014

(51) Int. Cl.
*A01K 27/00* (2006.01)
*A45F 3/04* (2006.01)

(52) U.S. Cl.
CPC ........... *A01K 27/00* (2013.01); *Y10T 24/44077* (2015.01); *A01K 27/008* (2013.01); *A45F 3/047* (2013.01)

(58) Field of Classification Search
USPC ......... 119/858, 863, 792, 770, 769; D30/153, D30/155; D11/79, 200, 218, 219, 236, 237, D11/210, 212
See application file for complete search history.

(56) References Cited

U.S. PATENT DOCUMENTS

| | | | | |
|---|---|---|---|---|
| D46,861 S | * | 1/1915 | Christi | D11/218 |
| 1,849,258 A | * | 3/1932 | Washburn | 24/186 |
| 1,853,889 A | * | 4/1932 | Alterson | 24/312 |
| 1,876,477 A | * | 9/1932 | Troendly | 24/321 |
| 1,988,890 A | * | 1/1935 | Fenton | 24/200 |
| 1,999,167 A | * | 4/1935 | White | 24/321 |
| 2,710,999 A | | 6/1955 | Davis | |
| 3,137,907 A | | 6/1964 | Kei | |
| 3,393,433 A | | 7/1968 | Barcus | |
| RE26,754 E | | 1/1970 | Fisher | |
| 3,576,056 A | | 4/1971 | Barcus | |
| 3,760,464 A | | 9/1973 | Higuchi | |
| 3,775,813 A | | 12/1973 | Higuchi | |
| 4,135,267 A | | 1/1979 | McKinney, Sr. et al. | |
| 4,148,224 A | | 4/1979 | Craig | |
| 4,321,891 A | | 3/1982 | Moeller | |
| D266,479 S | | 10/1982 | Hayakawa | |
| 4,414,865 A | | 11/1983 | Brooks et al. | |
| 4,810,102 A | | 3/1989 | Norton | |
| D302,140 S | | 7/1989 | Johnston | |
| 4,937,923 A | | 7/1990 | McEntire | |
| 4,967,622 A | | 11/1990 | Phillips | |
| 4,979,407 A | | 12/1990 | Hernandez et al. | |
| 5,088,160 A | | 2/1992 | Warrick | |
| 5,123,147 A | | 6/1992 | Blair | |
| 5,185,910 A | | 2/1993 | Ziaylek, Jr. et al. | |
| 5,247,905 A | * | 9/1993 | Arakawa | 119/863 |
| D363,257 S | * | 10/1995 | Anscher | D11/218 |
| 5,467,743 A | | 11/1995 | Doose | |
| D365,044 S | * | 12/1995 | Anscher | D11/218 |

(Continued)

OTHER PUBLICATIONS

Kurgo Wander Collar web-site, Dec. 10, 2009, www.kurgo.com/products./wcol.html, Author Unknown.

*Primary Examiner* — Yvonne Abbott-Lewis
(74) *Attorney, Agent, or Firm* — Wolff Law Offices, PLLC; Kevin Wolff

(57) ABSTRACT

A slider device includes a slider frame having a top rail and a bottom rail. A first parallel member connects the top and bottom rails and arranges generally perpendicular to the top and bottom rails, but lies in a common plane. A second parallel member disposes or arranges at an end of the frame opposite from the first parallel member. The second parallel member links or connects between the top and bottom rails. A third parallel member arranges intermediate to the first and second parallel member. A D-shaped ringlet couples to the frame adjacent to the first parallel member. The ringlet and frame lie in a common plane.

20 Claims, 8 Drawing Sheets

(56) References Cited

U.S. PATENT DOCUMENTS

| | | | |
|---|---|---|---|
| 5,474,033 A * | 12/1995 | Mitchell, Jr. | 119/860 |
| 5,664,844 A | 9/1997 | Greene | |
| 5,785,008 A | 7/1998 | Liu | |
| 5,785,010 A | 7/1998 | Koch | |
| 6,185,772 B1 | 2/2001 | Bates | |
| 6,357,092 B1 | 3/2002 | Burrows | |
| 6,460,746 B1 | 10/2002 | Amram | |
| D471,678 S * | 3/2003 | Hanna | D30/152 |
| 6,530,129 B1 | 3/2003 | Cheng | |
| 6,880,490 B2 * | 4/2005 | Hanna | 119/863 |
| D504,984 S * | 5/2005 | Jones | D30/152 |
| D536,280 S * | 2/2007 | Wemmer | D11/218 |
| D542,710 S * | 5/2007 | Yoshiguchi | D11/218 |
| 7,237,292 B1 | 7/2007 | Endres | |
| 7,263,750 B2 | 9/2007 | Keene et al. | |
| D579,820 S * | 11/2008 | Brown | D11/231 |
| D581,830 S * | 12/2008 | Slabaugh | D11/127 |
| D603,753 S | 11/2009 | Palmer et al. | |
| D623,030 S | 9/2010 | Spater | |
| 7,904,997 B2 | 3/2011 | Foubert | |
| 8,371,250 B2 * | 2/2013 | Konovalov | 119/718 |
| D682,155 S * | 5/2013 | Parsons | D11/218 |
| 2006/0102102 A1 * | 5/2006 | Bennett et al. | 119/792 |
| 2010/0031897 A1 | 2/2010 | Moeller | |
| 2011/0154955 A1 * | 6/2011 | Fidrych | 81/3.09 |

* cited by examiner

SLIDER DEVICE FOR A PET COLLAR/HARNESS

FIELD OF THE INVENTION

The present invention relates generally to an improvement in a slider mechanism, generally used in webbing applications such as collars for domestic animals.

BACKGROUND

Most adjustable straps use a slider mechanism or device to enable the wearer to alter the length of the strap. Exemplary uses of slider mechanisms include both pet collars and bags including backpacks, messenger bags, and the like. The current art instructs a specific slider device to adjust the strap and separate connectors for attaching accessories. For example, to attach an identity tag, a dog collar uses a D-ring at a separating mounting point from the slider. And, similarly, a backpack or messenger bag provides a separate short, non-adjustable strap to attach a luggage tag or L.E.D. light, for example.

So, while slider mechanisms are commonly used in applications where multiple hardware pieces or accessories are desired, the current art instructs providing separate hardware for each function. It is contemplated, therefore, that it would be beneficial to provide multiple functions in one piece of hardware. Further, such an innovation may open the possibility of other applications for accessories that are not contemplated in the current art. In yet other applications, adding an additional loop might be beneficial, but not practical due to space or cost requirements. Thus, the ability to combine two functions into one hardware piece would be advantageous.

For example, dog collars typically use a slider mechanism, but also a D-ring to attach the lead and sometimes a second D-ring to attach the Identity Tags. And, with over 78 million owned dogs and 86.4 million owned cats in the United States, according to a "National Pet Owners Survey" conducted by the American Pet Products Association in December 2011, the need for suitable collars is ever-increasing.

There are a myriad of pet collars on the market and generally known in the art. A common type of collar includes a slider device that enables the overall length of the collar to be adjusted. The majority of such slider devices include a generally rectilinear and planar configuration having three parallel members interconnected by perpendicular bars to form a rectangular or square shape. The three parallel members consist of an intermediate member about half-way between two outside parallel members. One end of a collar strap attaches to the center or intermediate member and a second end of the collar strap slides under the first outside parallel member, then over the intermediate member and then under the second outside member—this is well understood in the art.

Representative of slider technology, U.S. Pat. No. 5,664, 844 issued on Sep. 9, 1997 to Greene illustrates how a strap works in conjunction with a typical known slider device.

This common slider is used on both dog and cat collars. But, such use is not limited to cat and dog collars as it can be easily applied to many different uses. However, as illustrative of the use of a slider, a typical dog collar includes a clasp or buckle mechanism at one end of the collar and a mating feature at the second end. Typically, a D-ring locates at an intermediate portion of the strap. The D-ring, in the conventional dog collar, provides a coupling point for a leash to be releasable connected to the collar. And, the D-ring often serves as a mounting device for identification tags.

One common problem with collars having one D-ring for both coupling the leash to the collar and simultaneously to act as a mounting point for the animal's identification tags, which may include a dog-license tag, a separate owner's name tag, yet another dog's name tag, and possibly a medical alert tag, is that the combined use of the leash on that same D-ring results in damage to the various tags. This can make the tags unreadable. Further, many tags are coupled to the D-ring by means of a split ring. This split ring can be entangled in the clasp end of the leash when an owner mistakenly couples the leash to the split ring. And, because the split ring lacks the same strength of the D-ring, the dog can easily escape from the leash by pulling, which results in the split ring failing and the dog getting loose. This can be very dangerous to the dog and may frighten other people.

Other collar designs include two D-rings located at two discrete points along the length of the collar strap—one for coupling the leash to the collar and a second D-ring for attaching the I.D. tags. The two D-ring collar solves a common problem for many pet-owners, namely providing a first ring for a leash and a second ring for the i.d. tag, thus ensuring that the leash does not become entangled with the i.d. tag or otherwise damaging the i.d. tag. One problem with traditional collars having a single D-ring for the combined use of attaching both the i.d. tag and the leash is that the weight of the id tags causes the collar to rotate under the neck of the dog. This makes coupling the leash to that d-ring more difficult than is necessary.

One attempt to solve this particular problem includes the "Pet Leash Assemblies, Pet Collar Assemblies, and Methods of Using the Same," as disclosed by Moeller in United States Published Patent Application Number 2010/0031897 (Feb. 11, 2010). Therein Moeller describes a gate device arranged on a collar so that the gate offers a ringed opening perpendicular to the direction of the collar as it rests on the dog's neck. This facilitates coupling the leash, not only because it is separate from the D-ring, which has the I.D. tags, but it arranges about 180-degrees from the D-ring so that the weighted D-ring rotates under the dog's neck, presenting the ringed opening on the back of the dog.

Although the two D-ring collar, as generally known in the art, and the Moeller device solve one problem by providing a separate attaching point for the lease relative to the mounting point for I.D. tags, such structures are more costly than having a single D-ring and add complexity to the collar. It also does not solve the issue of attaching a leash to the accessory attachment by mistake, as both rings appear identical.

Thus, there remains a need for a collar that separates a mounting point for I.D. tags from the coupling point for the leash. Moreover, there remains a need for such a mounting point to use less resources than the double D-ring collars as taught in the art.

Besides the ID tags, a usage situation for dogs is safety. Owners like to make a safer walking situation for their pets at night by attaching battery powered lighting to dog's collars. In a standard dog collar, the D-Ring is secured to the collar in the area closest to the buckle. In many applications, the D-Ring alone is the heaviest point of the collar, thus the D-ring is always under the dog's neck. For safety lighting, this is not a good spot for general visibility. Thus, the need for a smaller accessory loop, weighing less than the leash attachment and buckle is needed. This will assure that the lighting is always on top of the dog and most visible.

Another use of sliders is on backpacks, book bags, messenger bags and the like. Again, the current art uses the slider to adjust a carrying strap. However, often the user of such a bag desires accessories to hang from the exterior of the bag.

To facilitate this desire, the current teaching in the art instructs attaching an auxiliary strap with a dedicated D-ring, particularly adapted to hang an accessory. Common accessories include L.E.D. lights, key chains, luggage tags, and whistles, for example.

Examples of the current art of sliders on bags, such as backpacks and messenger bags, include the teaching of Norton in U.S. Pat. No. 4,810,102 issued on Mar. 7, 1989. For example, FIGS. 1 and 2 illustrate separate hardware for each individual function. A slider (ref. no. 58) is presented to adjust strap length, the strap attaches to the bag by a clip (ref. no. 60) to a triangular shaped support (ref. no. 44). An accessory is attached to the exterior of the bag by means of loops (ref. no. 38, see also col. 3 lines 15-20).

Separate hardware for each function is also taught by Amram in U.S. Pat. No. 6,460,746 issued on Oct. 8, 2002. Again, the slider (ref. no. 38) is separate from D-rings (i.e. ref. no. 40 and ref. no. 130). The practice is so common, that one need only look at any number of traditional backpacks available for sale in the United States to observe dedicated D-rings on shortened straps having the sole purpose to attach accessories. The functions of closing or securing the bag closed is accomplished by dedicated hardware, which is separate from the accessory straps. And the slider is left to adjust the strap length.

Despite the teaching in the current art, it remains desirable to combine the function of the slider with a D-ring for accessories. One contemplated benefit of such a combination includes more efficient manufacturing of the collar, another advantage would be lighter weight, for example.

SUMMARY OF THE INVENTION

Recognizing that it would be advantageous to offer a slider mechanism adapted to provide a means for accessories to directly couple to the slider body without having to resort to new components on collars and bags, the present invention contemplates a slider that includes an integrated ringlet for accessories, such as a D-ring like loop. Further, such a design should minimize the raw materials needed, so, accordingly, it is advantageous to include such a d-ring or other shaped accessory loop that is optimized—not for threading additional webbing material through but—for hanging an accessory such as an identity tag. This ringlet feature could arrange in line with the major or minor curvature of the body of the slider, or in the same plane as the body of the slider if the slider is generally flat or, alternatively, the ringlet could stand-proud from the general curvature of the slider body at up to either a positive or minus 180-degrees from the slider body. A cast piece, for instance, the entire part could be on a curve and the ringlet could also be on that curve. And the ringlet member has a small opening, sized to enable coupling of additional items or accessories.

The present invention, therefore, reduces the complexity of previous slider plus D-ring solutions and provides a more economical and efficient design. To serve as an example of the contemplated improved slider device according to the present invention, two common applications will now be discussed so that the reader can more efficiently appreciate the scope and spirit of the present invention. One such contemplated example is an improved slider device for use on domesticated animals (such as a dog collar, cat collar, and the like).

The present invention overcomes the limitations known in the art of pet collars by presenting a solution that frees the typical D-ring mounted on a typical collar to a single duty of providing an attaching point for the leash. The present invention recognizes that today's collars incorporate slider devices to enable adjustable strap length of a collar. Moreover, the present invention recognizes the need to display pet I.D. tags on the collar but also recognizes that such I.D tags do not need the robustness and strength of the D-ring if its purpose is to solely display the I.D. tags. Also, many pet owners walk their pets in low light conditions. Commonly, a L.E.D. light attaches to the conventional D-ring; however, when the same D-ring is used to attach the lead, the light rotates upward and is blocked by the lead—this renders the light less effective. Accordingly, the present invention contemplates a slider mechanism including a ringlet member coupled to a traditional slider frame. The ringlet member has a small opening, sized to enable coupling of I.D. tags and or a split ring, but not large enough for a typical leash clasp mechanism to attach.

The present invention, therefore, reduces the complexity of previous double D-ring collar designs, provides a more economical and efficient design, yet enables separation of the leash attaching point from the I.D. tag mounting point.

Further, the present invention is well suited for use with backpacks, book bags, messenger bags and the like. Again, a combination slider and D-ring provides a lighter weight pack that is more economical to produce. There is already a need by the users of backpacks and the like to hang accessories on the exterior of the bag. And, there is already a need to provide an adjustable strap by means of a slider mechanism. Combining the two functions solves a problem common in the art, but until this invention, has never contemplated as a solution.

DRAWING

DESCRIPTION OF THE INVENTION

Figure 1:
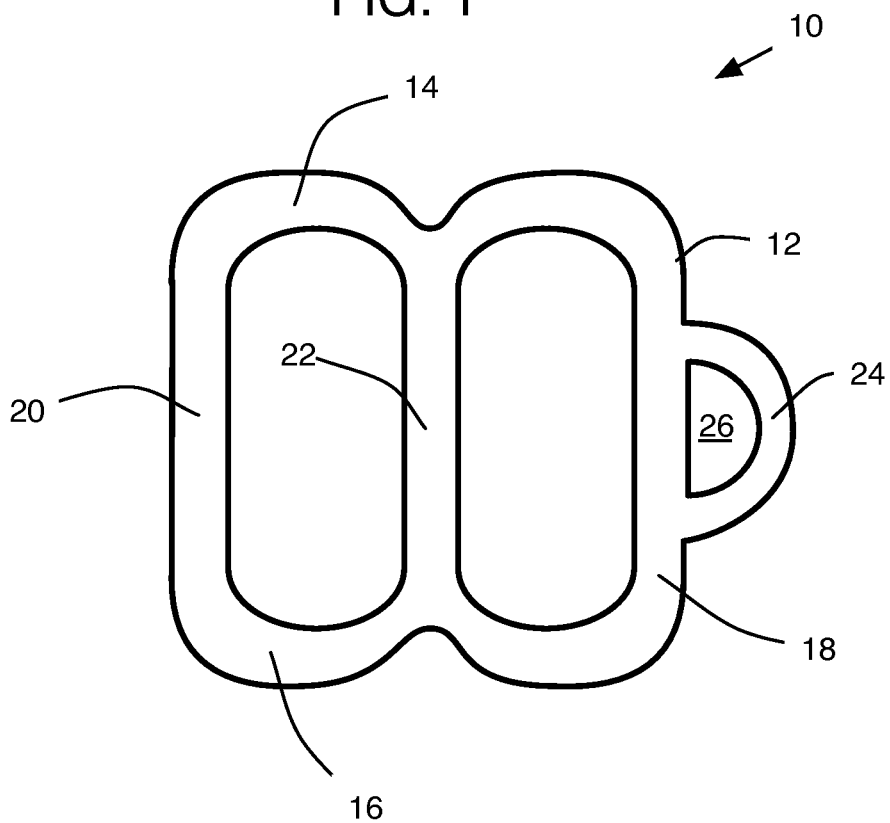
FIG. 1 is a top view of one embodiment according to the present invention.
Figure 2:
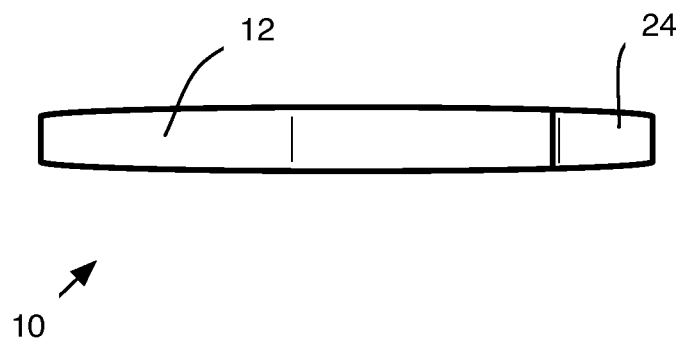
FIG. 2 is a front view of the embodiment of FIG. 1.

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

FIGS. 1-4 illustrate a first preferred embodiment according to the present invention. A slider device 10 for a collar includes a slider frame 12 having a top rail 14 and a bottom rail 16. A first parallel member 18 connects the top 14 and bottom 16 rails and arranges generally perpendicular to the top and bottom rails, but lies in a common plane (either a flat or curved plane, depending on the desired shape of the slider, as would be understood by those skilled in this art). A second parallel member 20 disposes or arranges at an end of the frame 12 opposite from the first parallel member. The second parallel member 20 links or connects between the top and bottom rails. A third parallel member 22 arranges intermediate to the first and second parallel member. The frame lies in a single plane or in the same curved plane and, accordingly, the each first 18, second 20, and third 22 parallel members and the top 14 and bottom 16 rails lie substantially in that same, common plane or in the same curved plane A ringlet member 24 couples to the first parallel member 18. The ringlet member arranges to present an opening 26 outside the slider frame. The ringlet member 24 lies in the same plane as the frame 12. In this preferred embodiment, the ringlet member 24 is D-shaped. However, other configurations would work equally well. It is important that the opening 26 be large enough to attach an I.D. tag or split ring holding an I.D. tag, but small enough to discourage use as a leash clasp attaching point. In this way the ringlet can be less robust, lighter, and more economical to produce and further, it will discourage the leash clasp from damaging the I.D. tags.

Figure 3:
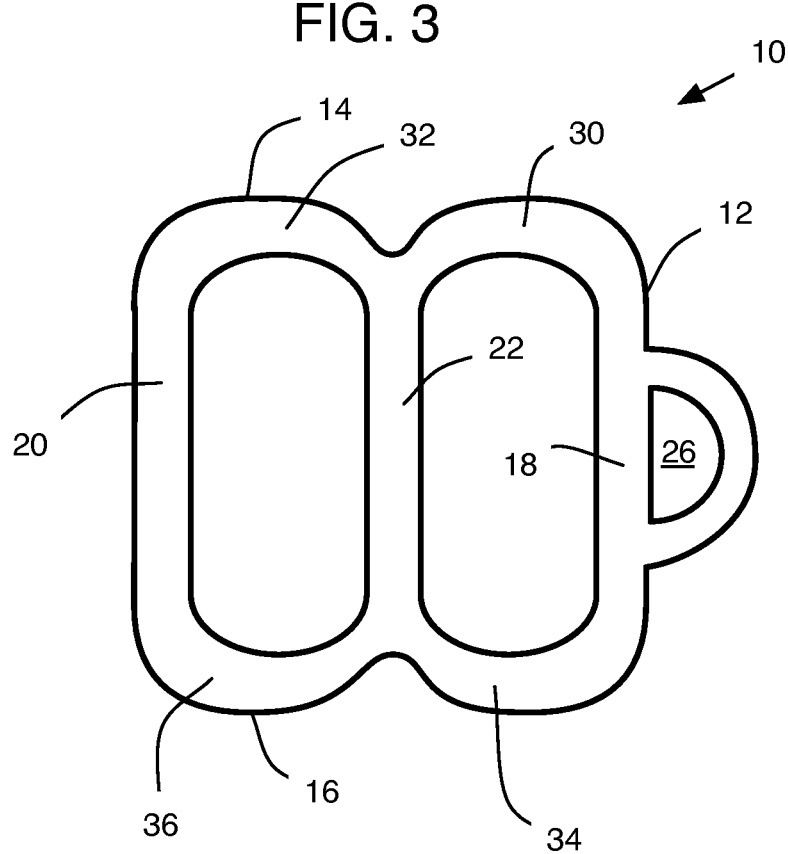
FIG. 3 is yet another top view of the embodiment of FIG. 1.
Figure 4:
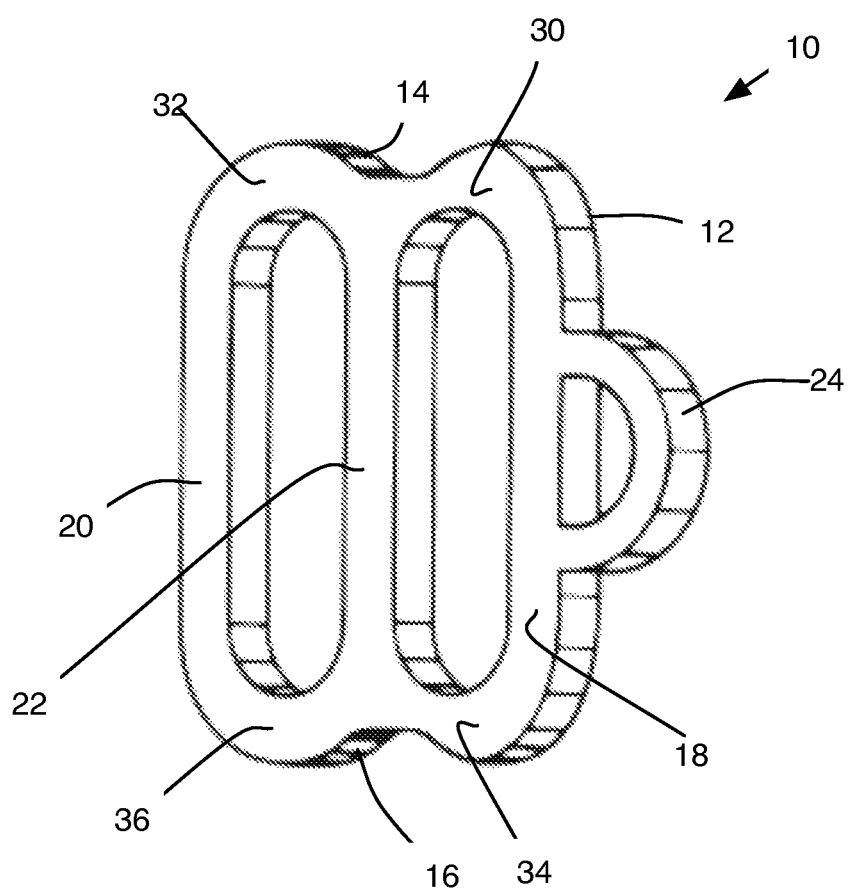
FIG. 4 is an offset top view of the embodiment of FIG. 1

With particular reference to FIG. 3, the frame 12 has a distinct top rail 14 consisting of a first inverted U-shaped connector 30 and a second inverted U-shaped connector 32. The first U-shaped connector 30 has a first end linking or coupling to the first parallel member 18 and a second end coupling to the intermediate parallel member 22. Similarly, the second U-shaped connector 32 has a corresponding first end coupling to the intermediate parallel member 22 and a second end coupling to the second parallel member 20.

In a similar manner, the bottom portion of the slider frame 12 includes two U-shaped connectors. The bottom rail 16 is configured of a first U-shaped connector 34 and a second U-shaped connector 36. The first U-shaped connector 34 includes a first end coupling to the first parallel member 18 and a second end coupling to the intermediate parallel member 22. And, the second U-shaped connector 36 includes a corresponding first end coupling to the intermediate parallel member 22 and a second end coupling to the second parallel member 20.

This configuration, as illustrated in FIGS. 1-4, is not only more aesthetically pleasing than the teachings of sliders in the prior art, it uses less material and is lighter, resulting in a more comfortable device than previously contemplated in the art.

The slider device according to the present invention can be produced in a number of ways; injection molded plastic, cast metal fabrication, or stamped metal fabrication. Typical materials in metal fabrication are zinc, steel, stainless steel, and aluminum. Metal coatings can have a variety of finishes to match the application.

In one contemplated preferred embodiment, the slider device 10 has an overall height of about 2.3 mm, a length of about 33.90 mm and a width of about 32.55 mm with the ringlet opening 26 of about 3.30 mm by about 8.4 mm. Each slot defined by adjacent parallel members is about 7.90 mm wide by about 26.50 mm long.

Figure 5:
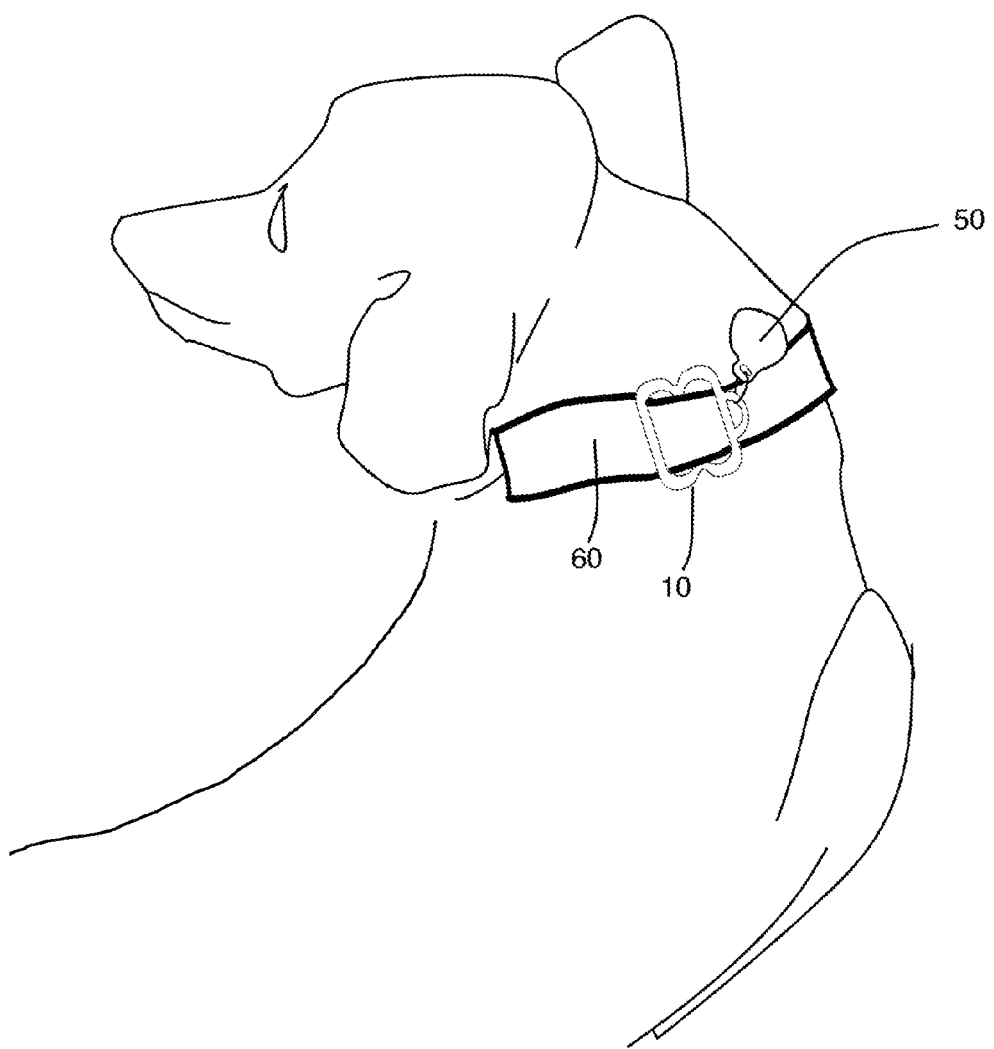
FIG. 5 shows the embodiment of FIG. 1 mounted on a collar on a domestic pet dog.
Figure 6:
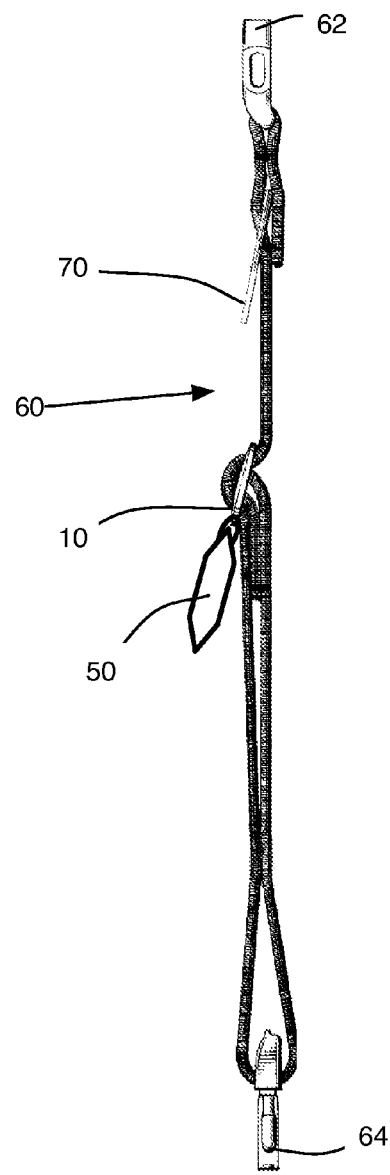
FIG. 6 is a side view of a collar having the slider device of FIG. 1.
Figure 7:
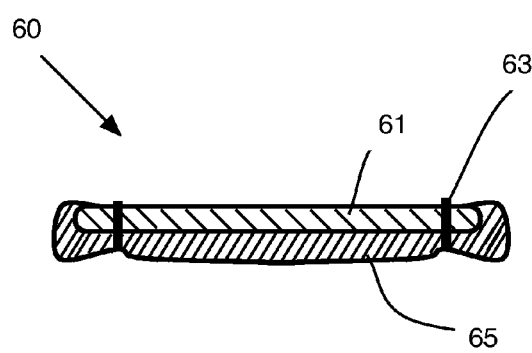
FIG. 7 is a cross section of the collar of FIG. 6.

FIGS. 5-7 show the slider device 10 of the embodiment of FIG. 1 on a two-ply collar 60 having a separate D-ring 70 for attaching a leash. An I.D. tag 50 attaches to the slider 10 of the present invention. A two-ply collar, as FIG. 7 illustrates, has a first material 61 coupled to a base material 65 by a means for fastening 63, such as stitching. The base ply consists of recycled bicycle tire inner tube material and the first ply consists of any one of a selection of conventional collar materials including leather, nylon, canvas, and the like, as would be easily understood by those in the art. In this embodiment, a conventional safety clasp mechanism consisting of a female end 62 and a tri-prong male end 64 conventionally couples to the strap of the collar 60.

In one contemplated embodiment, the slider device 10 of the present invention adapts to arrange on a collar 40, such as a dog or cat collar, as would be well understood in the art, and as FIG. 5 illustrates. A representative and contemplated collar of this embodiment consists of a strap with an industry standard plastic quick-connect coupling clasp system. The clasp system includes a female receptacle adjacent to a strap first end whereby a portion of the first end loops through a supporting member, provided by the female clasp end for this purpose, and doubles over itself and is coupled by known means, such as mechanical fastening by a thread interwoven between the overturned flap end, as would be commonly understood in this art. Also adjacent to this first end is a conventional D-ring or, alternatively, a combination D-ring and bottle opener according to the recitations of co-pending U.S. Published Patent Application Number 2011/0154955 published on Jun. 30, 2011, having the same inventor as the present invention and this disclosure hereby incorporates U.S. Published Patent Application Number 2011/0154955 by reference as if it were set out fully herein.

This conventional strap further includes a strap second end, which feeds through the slider 10 of the present invention. The second end further includes a mating male connector end slideably coupled to the strap at a second intermediate portion. Thus, as the slider 10 increases or decreases the overall collar strap length, the male connector moves and rotates relative to the strap portion passing through it. The male connector includes support features to enable this and is well understood in this art. One exemplary clasp system that is well suited to this first preferred embodiment of the present invention includes a clasp by ITW Nexus, of Des Plaines, Ill., USA, as model number C-25, for instance.

Other contemplated collar strap closing mechanisms include a conventional buckle clasping system. This well-understood system includes a strap first end doubled over a short distance, the overlap is maintained by stitching and/or riveting a portion of one end of the strap whereby the overlap captures a cross bar of the buckle frame. A single hole or oblong slot is punched in the strap to allow the pawl of the buckle to pass therethrough. At an intermediate portion of the strap adjacent to the second end 19 includes at least one hole and grommet for receiving the pawl.

Yet another contemplated closure mechanism includes a so-called seat belt or airline-belt style closure mechanism. As such the collar includes an improved buckle device adapted for use in a limited release application such as a pet collar. This closure mechanism includes a buckle assembly having a cover having a top with a downward turn release lip. The release lip, in the closed position, does not extend past the frame member and is recessed within the sidewalls and bottom wall of the frame. The cover includes high-positioned ledges that cause a cam latch to release a clasp from the buckle only when the cover has traveled at least about 80-degrees from horizontal. The cover hingeably mounts to a frame by means of a pin. The latch is supported by the pin. Tension against the cover is provided by a first biasing member and the latch cam is forced downward by a second biasing member. Full disclosure of this contemplated closure mechanism is set out in co-pending U.S. Published patent application Ser. No. 13/180,374, having the same inventor as the present invention and this disclosure hereby incorporates this pending application by reference as if it were set out fully herein.

Many known and existing collar strap designs are contemplated for use with the slider device 10 of the present invention. One particularly well-suited collar material includes a two-ply collar strap having two lock stitches, one on each edge running parallel to each other, holds or couples the first and second ply, which include a top or first ply material such as nylon, hemp, leather, bamboo webbing or other material and the re-claimed rubber (second ply or bottom material). Each lockstitch uses two threads, one passed through the needle and one coming from a bobbin or shuttle. Each thread stays on the same side of the material being sewn, interlacing with the other thread at each needle hole. The optimum thread weight is 92 oz polyester, with a hole spacing of about 4.5 mm. One particular advantage of such a contemplated two-ply strap material, wherein one ply consists of reclaimed bicycle inner tube rubber, the second ply consists of a hydrophobic material such as nylon or polyester, is that the combination of a stretchable material (rubber) and a non-stretch material (nylon or polyester) attached with interlocking stitching results in a laminate that has a controlled amount of stretch, which can be varied by changing the length and tension of the interlocking stitch. The use of small, controlled amount of stretch adds a cushioning element to the collar and reduces the force on the dog's neck from a leash. Because the force felt by the animal around the neck is a function of the mass of the collar and leash times the acceleration, a reduction in acceleration due to a stretch or resiliency designed into the collar due to the spacing of the stitching and ply materials results in a corresponding reduction of the force on the dog's neck. This results in a collar that is comfortable for the dog to wear, resists fraying of the edges, is quick drying, and resists odors.

Referring generally to FIGS. 1-7, other contemplated embodiments of the present invention include a slider device 10 for a collar 60 for an animal. The collar includes a strap member having an intermediately disposed D-ring 70. The slider device is separate from the D-ring and the slider device includes a slider frame comprising 12 a top rail 14 and a bottom rail 16, a first parallel member 18 connecting the top and bottom rail, this member is arranged generally perpendicular to the top and bottom rails. The frame also includes a second parallel member 20 disposed at an end of the frame 12 opposite from the first parallel member 18, the second parallel member also connecting the top and bottom rails, and a third parallel member 22 arranged intermediate to the first and second parallel members. And, each first, second, and third parallel member and the top and bottom rails lie substantially in the same plane.

The slider 10 also includes a ringlet member 24 coupled to the frame 12 adjacent to the first parallel member 18 and the ringlet is disposed or otherwise arranged to present an opening 26 outside the slider frame 12. And, further, the ringlet member 24 is also arranged substantially coplanar to the slider frame.

More preferably, the frame includes a top rail 14 having two inverted U-shaped segments or connectors; a first U-shaped connector 30 and a second U-shaped connector 32. The first U-shaped connector 30 has a first end coupling to the first parallel member 18 and a second end coupling to the intermediate parallel member 22. The second U-shaped connector 32 has a corresponding first end coupling to the intermediate parallel member 22 and a second end coupling to the second parallel member 20.

The ringlet member 24, most preferably, resembles a D-shaped ring member.

And, the frame 12 has a bottom rail 16 that is, preferably, consisting of two interconnected segments; a first U-shaped connector 34 and a second U-shaped connector 36. The first U-shaped connector having a first end coupling to the first parallel member 18 and a second end coupling to the intermediate parallel member 22, and the second U-shaped connector 36 having a corresponding first end coupling to the intermediate parallel member 22 and a second end coupling to the second parallel member 20.

In yet another contemplated embodiment according to the present invention, a collar 60 for a pet includes a strap member and an improved slider device 10 arranged on the strap member. The improved slider device includes a slider frame comprising a top rail and a bottom rail, a first parallel member connecting the top and bottom rail arranged generally perpendicular to the top and bottom rails, a second parallel member disposed at an end of the frame opposite from the first parallel member, the second parallel member connecting the top and bottom rails, and a third parallel member arranged intermediate to the first and second parallel member, and wherein each first, second, and third parallel member and the top and bottom rails lie substantially in the same plane. Further, the frame 12 includes a ringlet member 24 coupled to the first parallel member arranged to present an opening outside the slider frame, and whereby the ringlet member arranged substantially coplanar to the slider frame.

Further, this collar 60 has a two-ply material and a closure mechanism arranged on at least one end of the strap member, the closure mechanism consisting of any one of the following, a safety clasp, a seat-belt style buckle, or a buckle having a pawl.

The strap member further comprises a combination D-ring and bottle opener disposed at an intermediate portion of the strap member.

The strap member further comprises a conventional D-ring disposed at an intermediate portion of the strap member.

Figure 8:
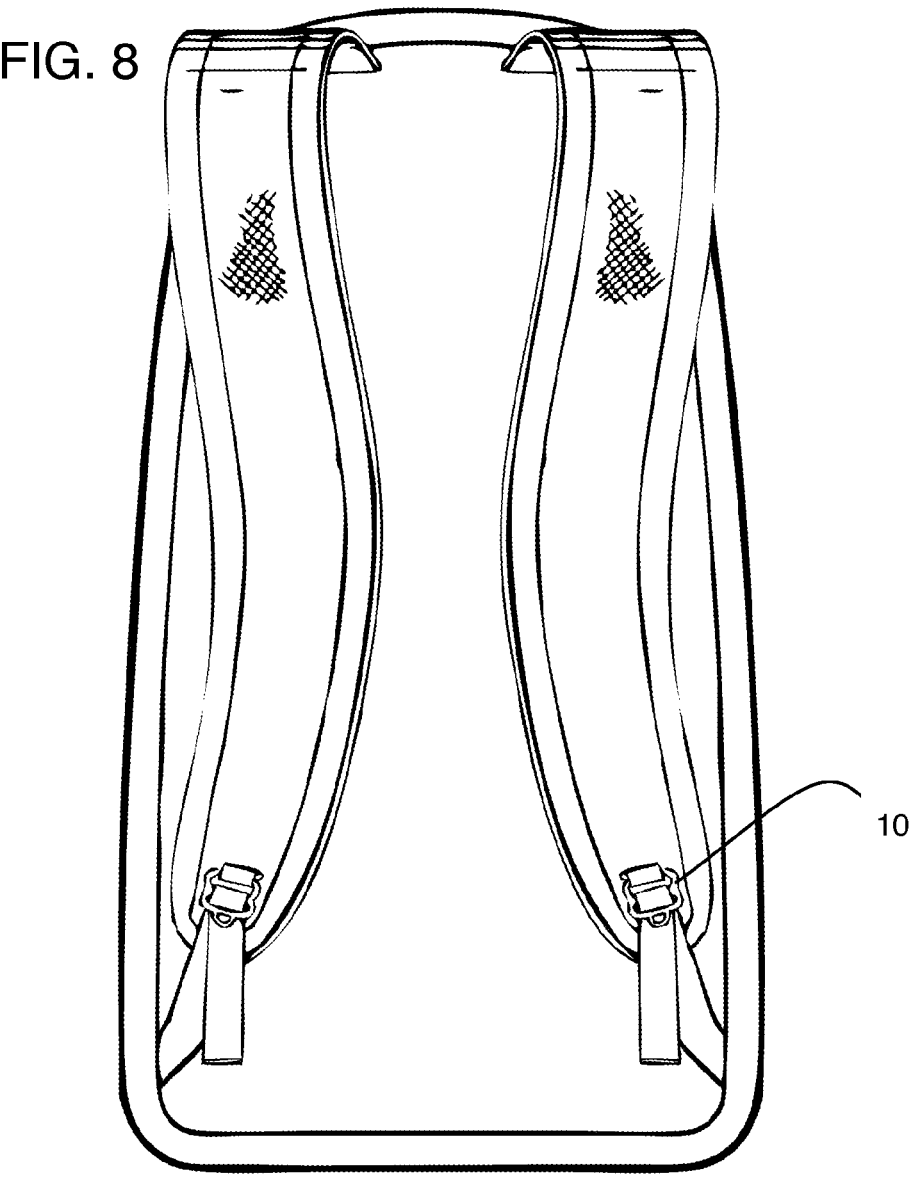
FIG. 8 is back view of the slider device according to the present invention as it would be used on a backpack.

Making particular reference to FIG. 8, the present invention is well suited for use on day bags, backpacks, book bags, messenger bags, and the like. Accordingly, a slider device 10, as discussed above, couples to at least one strap from a backpack, book bag, messenger bag, daypack, and the like, as would be conventionally understood. The slider device 10 enables one piece of hardware to accomplish multiple tasks—namely allowing for the adjustment of the strap, but also providing a mounting point for externally hung accessories such as lights, keys, identity tags, compasses, and the like, for example. Accordingly the slider device 10 includes a slider frame comprising 12 a top rail 14 and a bottom rail 16, a first parallel member 18 connecting the top and bottom rail, this member is arranged generally perpendicular to the top and bottom rails. The frame also includes a second parallel member 20 disposed at an end of the frame 12 opposite from the first parallel member 18, the second parallel member also connecting the top and bottom rails, and a third parallel member 22 arranged intermediate to the first and second parallel members. And, each first, second, and third parallel member and the top and bottom rails lie substantially in the same plane.

The slider 10 also includes a ringlet member 24 coupled to the frame 12 adjacent to the first parallel member 18 and the ringlet is disposed or otherwise arranged to present an opening 26 outside the slider frame 12. And, further, the ringlet member 24 is also arranged substantially coplanar (either a flat plane or curved plane) to the slider frame.

Figure 9:
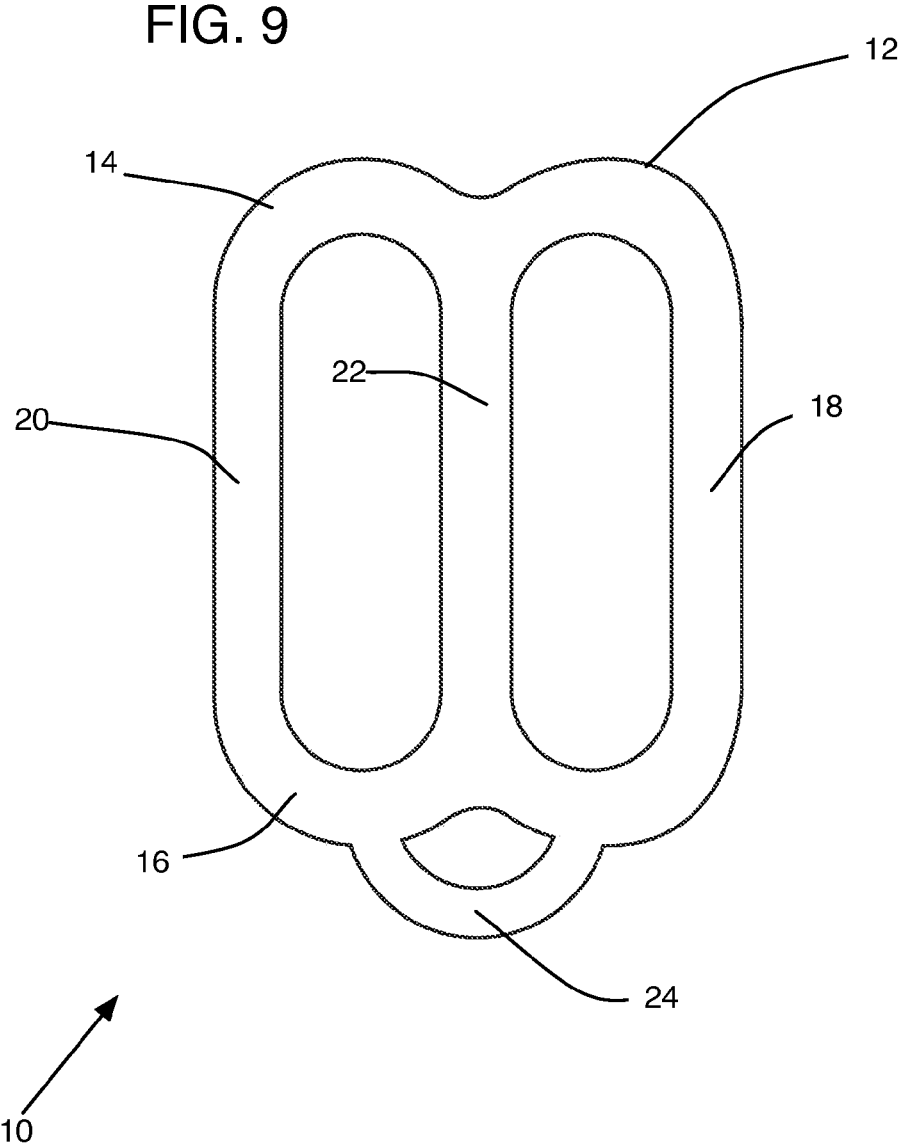
FIG. 9 is a top view of an alternative slider device according to the present invention wherein the ringlet arranges adjacent to the first parallel member.
Figure 12:
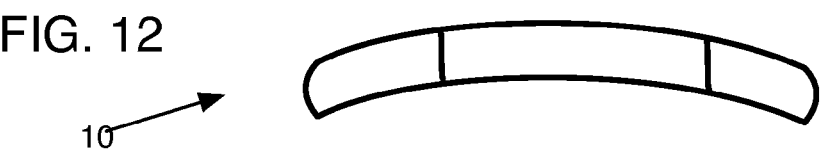
FIG. 12 is a front view of an alternative slider body.
Figure 11:
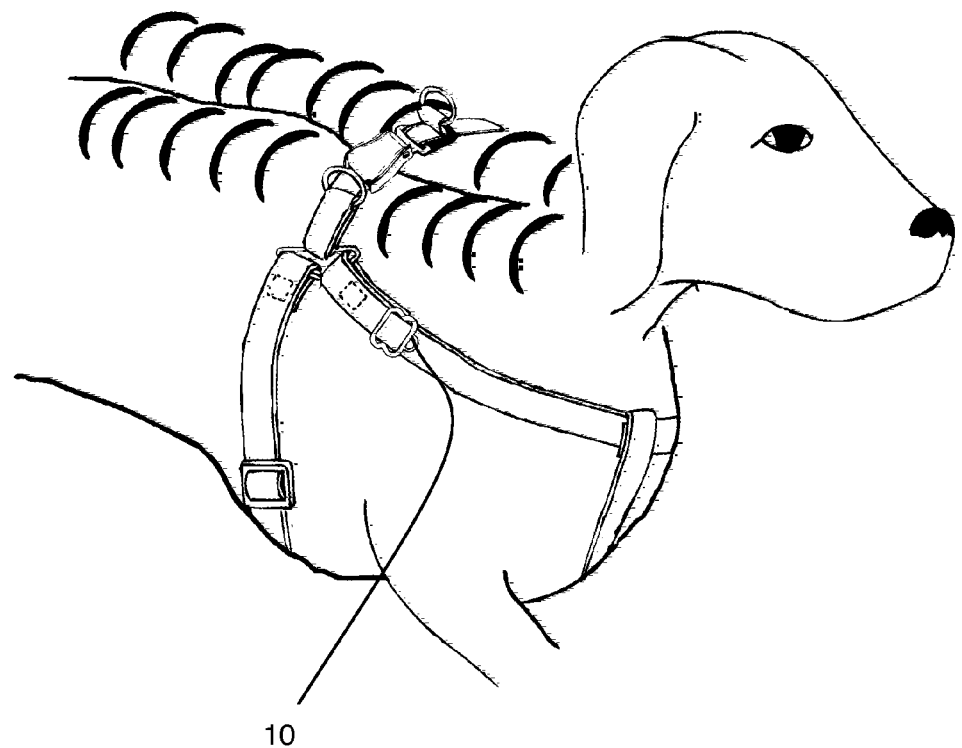
FIG. 11 is a front view showing the slider of the present invention in relation to a pet harness.
Figure 10:
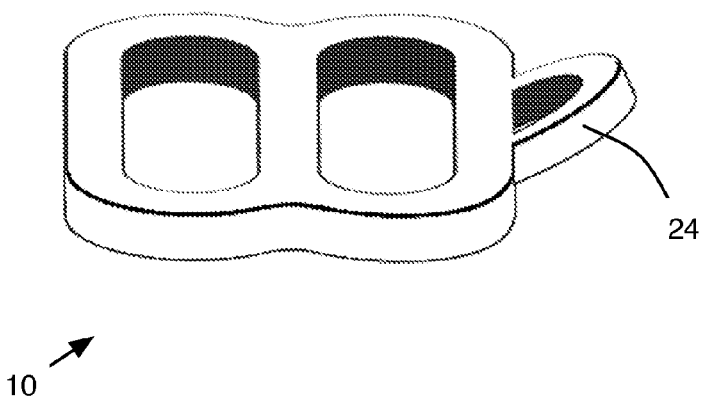
FIG. 10 is an offset top view of an alternative slider having an accessory loop at an offset angle between 0 and 180-degrees

FIGS. 9 and 12 illustrate a slider device 10 having a frame 12 arranged in a curved plane. However, the ringlet member 24 arranges adjacent to the bottom rail 16 and can arrange in-line with or at any angle above or below the plane or curved plane of the slider body in a range from about 180-degrees from this reference plane or curved plane.

Although the invention has been particularly shown and described with reference to certain embodiments, it will be understood by those skilled in the art that various changes in form and detail may be made without departing from the spirit and scope of the invention.

I claim:

1. An apparatus, comprising:
   a slider device comprising:
      a slider frame a top rail and a bottom rail, a first parallel member connecting the top and bottom rail arranged generally perpendicular to the top and bottom rails, a second parallel member disposed at an end of the frame opposite from the first parallel member, the second parallel member connecting the top and bottom rails, and a third parallel member arranged intermediate to the first and second parallel member, and wherein each first, second, and third parallel member and the top and bottom rails cooperate to define a flat or curved surface of the slider frame; and
      an accessory loop having a ringlet member coupled to approximately a middle area of the first parallel member or the top rail of the slider frame arranged to present an opening outside the slider frame that is smaller than an opening defined by the top and bottom rail cooperating with the intermediate member and the first parallel member; and
   a strap having a first end and a second end, wherein the slider is fixably connected to the first end of the strap and the second end of the strap feed through the slider so as to adjust a length of the strap.

2. The apparatus of claim 1 wherein:
   the ringlet member is shorter in length and width than a length and width of the opening formed by the top and bottom rail cooperating with the intermediate member and the first parallel member.

3. The apparatus of claim 1 wherein:
   the ringlet member is disposed in a same plane as the slider frame.

4. The apparatus of claim 1 wherein:
   The ringlet member is coplanar with the slider frame and connected to the first parallel member or the top rail of the slider frame, each end of the ringlet being connect at a separate one of two locations.

5. The apparatus of claim 1 wherein the ringlet member comprises a generally D-shaped ring member.

6. The apparatus of claim 1 wherein:
   the top rail or bottom rail further comprises a first U-shaped connector and a second U-shaped connector wherein
      the first U-shaped connector having a first end coupling to the first parallel member and a second end coupling to the intermediate parallel member, and
      the second U-shaped connector having a corresponding first end coupling to the intermediate parallel member and a second end coupling to the second parallel member.

7. The apparatus of claim 1 wherein: the accessory loop is not coplanar with the slider frame.

8. A collar for a pet comprising:
   a strap having a first end and a second end;
   a slider being fixably connected to the first end of the strap and having the second end of the strap feed through the slider so as to adjust a size of the collar, the slider comprising a slider frame comprising a top rail and a bottom rail, a first parallel member connecting the top and bottom rail arranged generally perpendicular to the top and bottom rails, a second parallel member disposed at an end of the frame opposite from the first parallel member, the second parallel member connecting the top and bottom rails, and a third parallel member arranged intermediate to the first and second parallel member, and wherein each first, second, and third parallel member and the top and bottom rails lie substantially in the same plane and form thereby two approximately equal size parallel slots through which the strap is fed for adjusting the collar size; and
   a ringlet connected to the slider frame arranged to present an opening outside the slider frame, the ringlet arranged substantially coplanar to the slider frame.

9. The collar of claim 8 wherein:
   the strap further comprises a strap body comprising a two-ply material, one of the two materials including a rubber type material.

10. The collar of claim 8 further comprises a closure mechanism arranged on at least the second end of the strap, the closure mechanism consisting of anyone of the following, a safety clasp, a seat-belt style buckle, or a buckle having a pawl.

11. The collar of claim 8 further comprises a combination D-ring and bottle opener disposed at an intermediate portion of the strap.

12. The collar of claim 8 wherein:
    the ringlet further comprises a generally D-shaped ring that is shorter in length than the side of the slider rail or parallel member to which it is connected at a middle area.

13. The collar of claim 8 wherein:
    the slider has only two slots through which the strap is fed; and
    the ringlet is disposed adjacent to the first parallel member.

14. The collar of claim 8 wherein:
    the slider has only two slots through which the strap is feed; and
    the ringlet is disposed adjacent to the bottom rail.

15. An apparatus, comprising:
    a dog collar including:
       a strap having a first end and a second end opposite the first end of the strap;
       a buckle attached at least one of the first end of the strap or the second end of the strap, for connecting the strap together to form the collar into a continuous loop;
       a leash attachment mechanism connected to the strap; and
       a slider having the strap feed through the slider, the slider including a slider frame and a ringlet, the slider frame including a top rail and a bottom rail, a first parallel member connecting the top and bottom rail arranged generally perpendicular to the top and bottom rails, a second parallel member disposed at an end of the frame opposite from the first parallel member, the second parallel member connecting the top and bottom rails, and a third parallel member arranged intermediate to the first and second parallel member, and form thereby two adjacent parallel slots through which the strap is fed for movement along the strap, and the ringlet connected to the outside of the slider frame arranged to present an opening outside the slider frame that is smaller in size than either of the adjacent parallel slots and formed within an outside perimeter of the slider frame.

16. The apparatus of claim 15, wherein
    the buckle has a first connecting part and a second connecting part that mate together and lock together to form a closed loop collar position;

the slider is connected to one of the first end of the strap and the second end of the strap so as to be at the opposite strap end from the buckle, and the slider having the strap feed through the slider so as to adjust a size of the collar; and the two adjacent parallel slots are approximately equal in size.

17. The apparatus of claim 16, wherein the buckle is selected from the groups consisting of: a safety clasp buckle, a seat-belt style buckle, and a buckle having a pawl.

18. The apparatus of claim 17, wherein the strap is made of a two ply material stitched or sewn together, one ply being a rubber type material.

19. The apparatus of claim 18, wherein at least one of the components of the dog collar is made of recycled materials.

20. The apparatus of claim 15, wherein the leash attachment mechanism is a combination D-ring and bottle opener.

* * * * *